(12) United States Patent
Plunkett

(10) Patent No.: US 10,882,725 B2
(45) Date of Patent: Jan. 5, 2021

(54) PALLET DISMANTLING SYSTEM

(71) Applicant: Brenda Plunkett, Orillia (CA)

(72) Inventor: Brenda Plunkett, Orillia (CA)

(*) Notice: Subject to any disclaimer, the term of this patent is extended or adjusted under 35 U.S.C. 154(b) by 0 days.

(21) Appl. No.: 15/634,731

(22) Filed: Jun. 27, 2017

(65) Prior Publication Data

US 2018/0370782 A1    Dec. 27, 2018

(51) Int. Cl.
*B66F 15/00* (2006.01)
*B23P 19/04* (2006.01)

(52) U.S. Cl.
CPC ............ *B66F 15/00* (2013.01); *B23P 19/041* (2013.01)

(58) Field of Classification Search
CPC ............................ B66F 15/00; B23Q 19/041
USPC ........................................................ 254/131.5
See application file for complete search history.

(56) References Cited

U.S. PATENT DOCUMENTS

| | | | | |
|---|---|---|---|---|
| 1,309,734 A * | 7/1919 | Hemfling, Sr. | ......... | B66F 15/00 254/131 |
| 1,389,183 A * | 8/1921 | Burke | ..................... | E04G 23/08 254/131 |
| 1,644,070 A * | 10/1927 | Martin | ..................... | B25B 27/26 29/216 |
| 2,195,667 A * | 4/1940 | Baker | ..................... | B25B 27/00 254/131 |
| 5,176,363 A * | 1/1993 | Bowlin | ................... | B25C 11/00 254/131 |
| 5,181,694 A * | 1/1993 | Collins | ..................... | B66F 5/04 254/124 |
| 5,423,114 A * | 6/1995 | Johnson | ................ | B23P 19/041 254/131 |
| 5,447,289 A * | 9/1995 | Callahan | ................ | B25C 11/00 254/131 |
| 5,601,277 A * | 2/1997 | Larson | ................. | B25H 1/0014 254/131 |
| 5,636,577 A * | 6/1997 | Gow | ................... | B65D 19/0095 108/51.3 |
| 5,836,222 A * | 11/1998 | Harpell | ................ | E04D 15/003 81/45 |
| 6,477,758 B2 * | 11/2002 | Krebel | ................ | F24C 15/2035 254/131 |
| 6,644,627 B1 | 11/2003 | Forrester | | |
| D532,273 S | 11/2006 | Yoson | | |
| 7,222,404 B1 * | 5/2007 | Lindsey | .................. | B25B 31/00 29/243.56 |
| 8,215,617 B2 | 7/2012 | Liou | | |
| 8,360,396 B2 * | 1/2013 | Robledo | ................... | B66F 3/16 254/1 |
| 8,434,739 B1 * | 5/2013 | Connolly | ................ | B66F 15/00 254/130 |
| 8,893,889 B2 * | 11/2014 | Soukup | .................... | B65D 9/06 206/454 |

(Continued)

*Primary Examiner* — George B Nguyen

(57) ABSTRACT

A pallet dismantling system includes a pallet that has a frame, a plurality of slats and a plurality of nails. Each of the nails extends through slats and engages the frame to fasten the slats on the frame. A tool is provided to disassemble the pallet and the tool includes a slot. The tool is selectively inserted between a selected one of the slats and the frame. Additionally, a selected one of the nails is positioned in the slot. The tool is urged to lift the selected slat from the frame. Moreover, the tool inhibits the nail from splintering the selected slat when the selected slat is removed from the frame.

7 Claims, 4 Drawing Sheets

(56) References Cited

U.S. PATENT DOCUMENTS

| | | | |
|---|---|---|---|
| 8,978,241 B2* | 3/2015 | Smith | B23P 19/041 |
| | | | 29/239 |
| D786,042 S * | 5/2017 | Bridges | D8/14 |
| 2002/0134971 A1* | 9/2002 | Christensen | B66F 15/00 |
| | | | 254/25 |
| 2007/0045599 A1* | 3/2007 | Bilyeu | B66F 15/00 |
| | | | 254/25 |
| 2010/0140575 A1* | 6/2010 | Liou | B66F 15/00 |
| | | | 254/131.5 |
| 2013/0192040 A1* | 8/2013 | Townsend | B25C 11/00 |
| | | | 29/426.5 |
| 2014/0182107 A1* | 7/2014 | Nestor | B66F 15/00 |
| | | | 29/426.5 |
| 2017/0144876 A1* | 5/2017 | Kasan | B66F 15/00 |

* cited by examiner

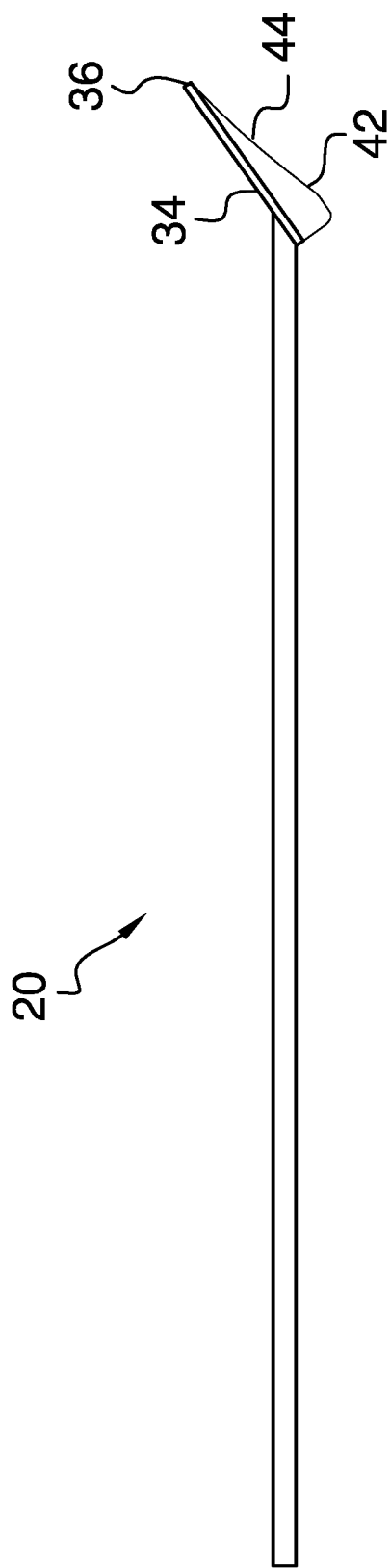

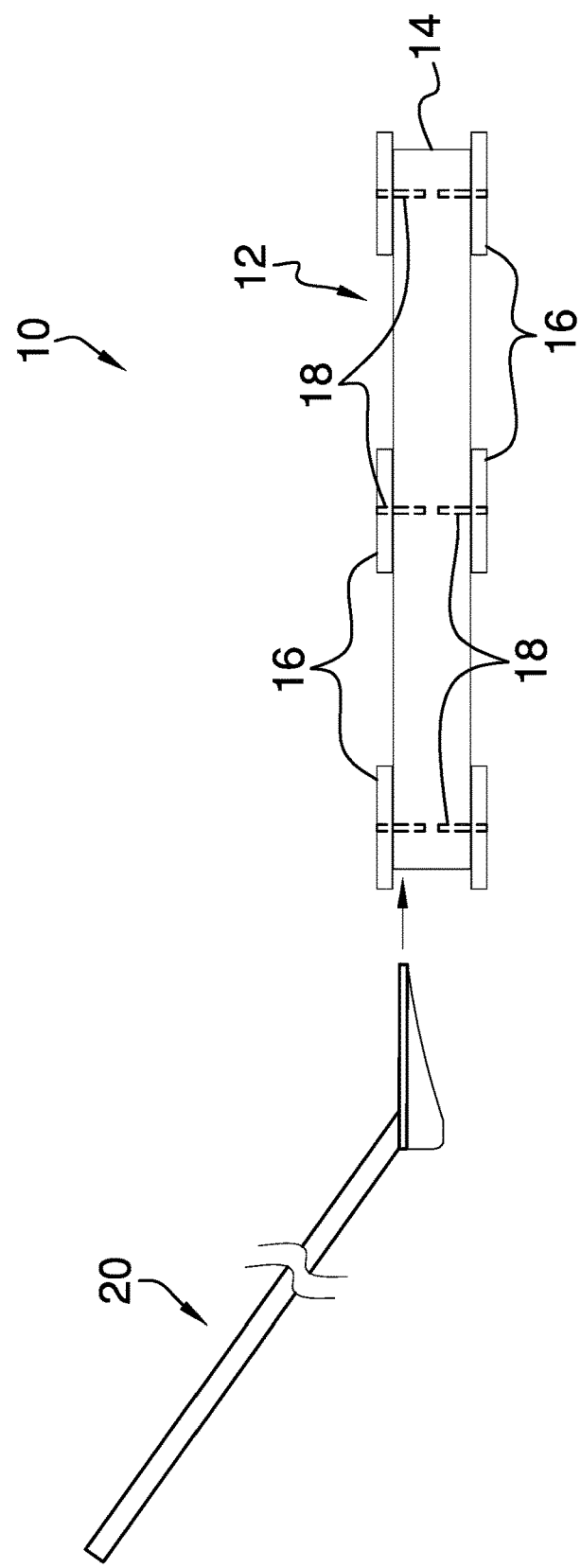

US 10,882,725 B2

PALLET DISMANTLING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art including Information Disclosed under 37 CFR 1.97 and 1.98

The disclosure and prior art relates to dismantling devices and more particularly pertains to a new dismantling device for dismantling a pallet without damaging slats on the pallet.

BRIEF SUMMARY OF THE INVENTION

An embodiment of the disclosure meets the needs presented above by generally comprising a pallet that has a frame, a plurality of slats and a plurality of nails. Each of the nails extends through slats and engages the frame to fasten the slats on the frame. A tool is provided to disassemble the pallet and the tool includes a slot. The tool is selectively inserted between a selected one of the slats and the frame. Additionally, a selected one of the nails is positioned in the slot. The tool is urged to lift the selected slat from the frame. Moreover, the tool inhibits the nail from splintering the selected slat when the selected slat is removed from the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a right side view of a tool of an embodiment of the disclosure.

FIG. 6 is a perspective in-use view of an embodiment of the disclosure.

DETAILED DESCRIPTION OF THE INVENTION

Figure 1:
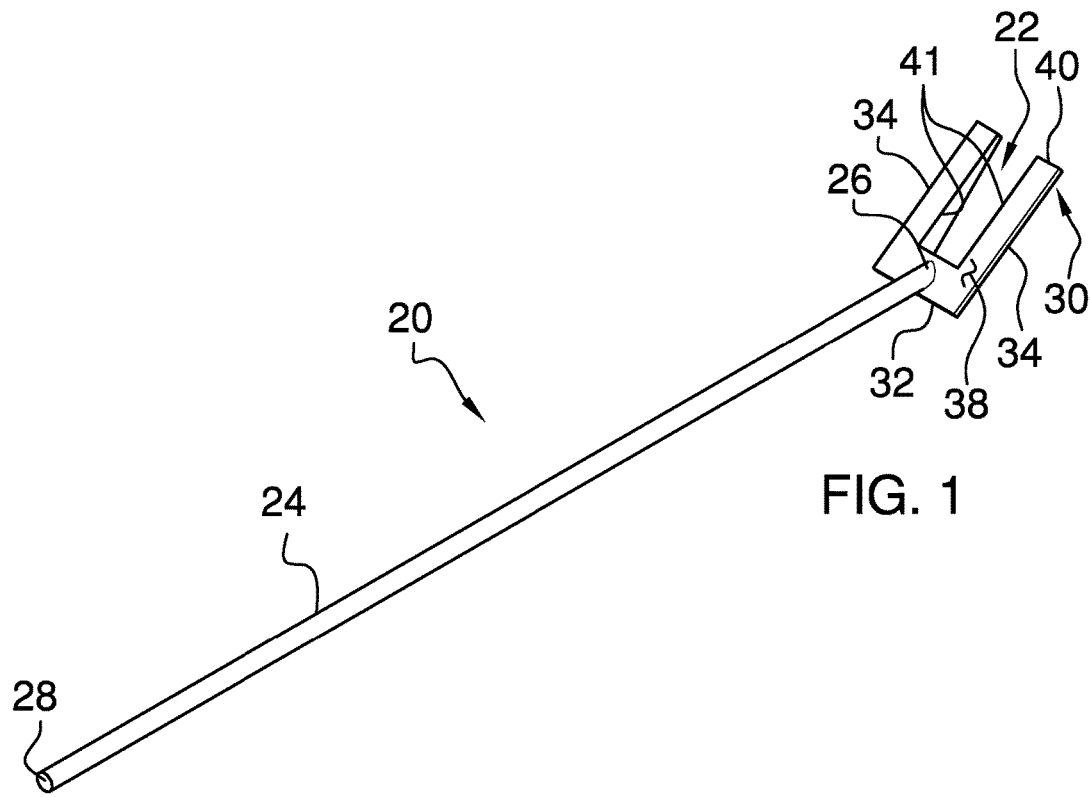
FIG. 1 is a perspective view of a tool of a pallet dismantling system according to an embodiment of the disclosure.
Figure 2:
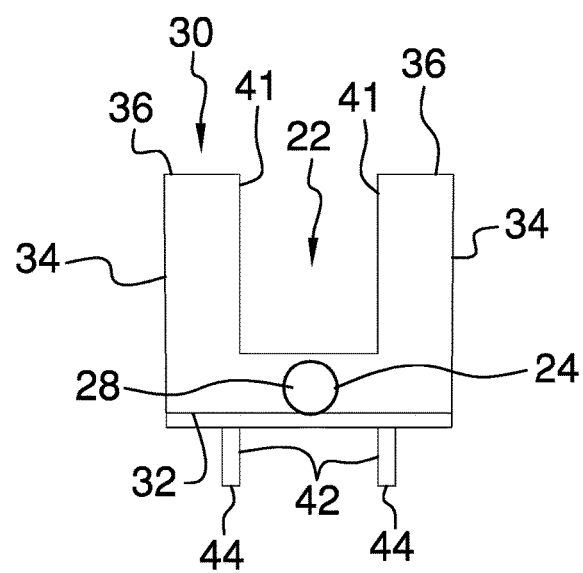
FIG. 2 is a back view of tool of an embodiment of the disclosure.
Figure 3:
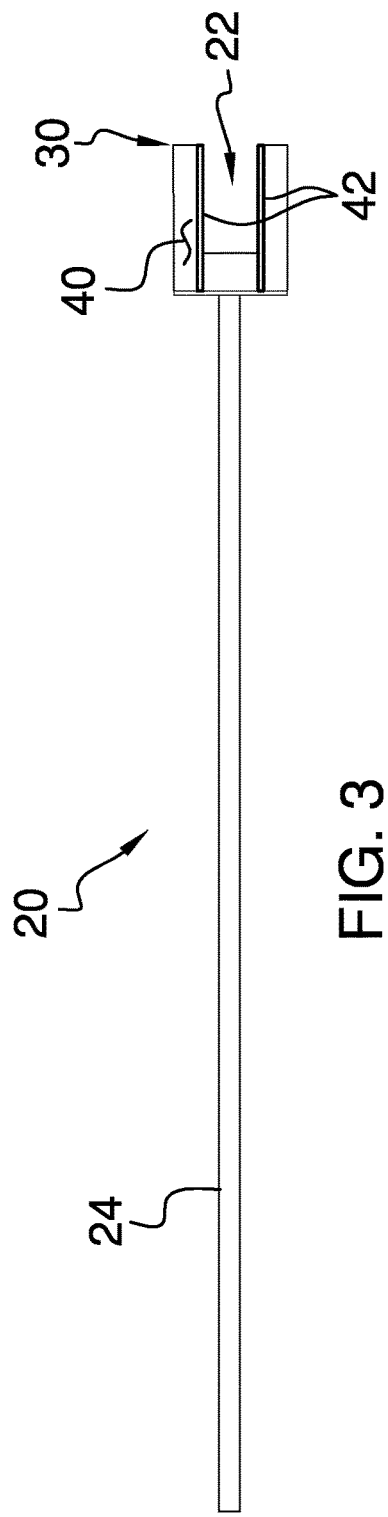
FIG. 3 is a bottom view of a tool of an embodiment of the disclosure.
Figure 4:
FIG. 4 is a top view of a tool of an embodiment of the disclosure.

With reference now to the drawings, and in particular to FIGS. 1 through 6 thereof, a new dismantling device embodying the principles and concepts of an embodiment of the disclosure and generally designated by the reference numeral 10 will be described.

As best illustrated in FIGS. 1 through 6, the pallet dismantling system 10 generally comprises a pallet 12 that has a frame 14, a plurality of slats 16 and a plurality of nails 18. Each of the nails 18 extends through slats 16 and engages the frame 14 to fasten the slats 16 on the frame 14. The pallet 12 may be a wooden pallet of any conventional design. A tool 20 is provided to selectively disassemble the pallet 12 and the tool 20 includes a slot 22. The tool 20 is selectively inserted between a selected one of the slats 16 and the frame 14 having a selected one of the nails 18 being positioned in the slot 22. The tool 20 is urged to lift the selected slat 16 from the frame 14 and the tool 20 inhibits the nail 18 from splintering the selected slat 16 when the selected slat 16 is removed from the frame 14.

The tool 20 comprises a rod 24 that has a first end 26 and a second end 28. The rod 24 is elongated between the first 26 and second 28 ends. The tool 20 includes a pair of forks 30 comprising a central member 32 extending between a pair of outward members 34. Each of the outward members 34 has a distal end 36 with respect to the central member 32. The outward members 34 are spaced apart from each other to define the slot 22. Additionally, the slot 22 extends between the distal end 36 corresponding to each of the outward members 34 and the central member 32.

The pair of forks 30 has a top surface 38 and a bottom surface 40. The first end 26 of the rod 24 is coupled to the top surface 38 corresponding to the central member 32. Moreover, the rod 24 is oriented to angle upwardly from the top surface 38 such that the forks 30 form an obtuse angle with the rod 24. The forks 30 are selectively inserted between the selected slat 16 and the frame 14. Moreover, each of the forks 30 engages the slat 16 on opposite sides of the selected nail 18.

A pair of ramps 42 is each of the ramps 42 is coupled to and extends downwardly from the bottom surface 40 corresponding to an associated one of the outward members 34. Each of the ramps 42 has a bottom edge 44 that slopes downwardly between the distal end 36 of the associated outward member 34 and the central member 32. The bottom edge 44 corresponding to each of the ramps 42 engages the frame 14 when the forks 30 are positioned between the selected slat 16 and the frame 14. Moreover, the ramps 42 facilitate the forks 30 to rock upwardly on the frame 14 when the rod 24 is urged downwardly. Thus, each of the forks 30 urges the selected slat 16 upwardly from the frame 14 when the rod 24 is urged downwardly. In this way the selected slat 16 is removed from the frame 14 without splintering, cracking and breaking.

In use, the tool 20 is manipulated to position the forks 30 between the selected slat 16 and the frame 14. Moreover, the forks 30 are positioned such that the selected nail 18 is positioned in the slot 22. The rod 24 is urged downwardly thereby facilitating the forks 30 to urge the selected slat 16 upwardly. In this way the selected slat 16 is removed from the frame 14. The forks 30 inhibit the selected nail 18 from splintering and otherwise damaging the selected slat 16. Thus, the selected slat 16 is undamaged thereby facilitating the selected slat 16 to be used for crafts and the like. The tool 20 is manipulated to remove all of the slats 16 from the frame 14.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pallet dismantling system comprising:
a pallet having a frame, a plurality of slats and a plurality of nails, each of said nails extending through slats and engaging said frame to fasten said slats on said frame; and
a tool being configured to be manipulated, said tool including a slot, said tool being selectively inserted between a selected one of said slats and said frame having a selected one of said nails being positioned in said slot, said tool being urged to lift said selected slat from said frame such that said tool inhibits said nail from splintering said selected slat when said selected slat is removed from said frame, said tool including
a pair of forks comprising a central member extending between a pair of outward members, each of said outward members having a distal end with respect to said central member, said outward members being spaced apart from each other to define said slot, said slot extending between said distal end corresponding to each of said outward members and said central member, said pair of forks having a top surface and a bottom surface, and
a pair of ramps, each of said ramps being coupled to and extending downwardly from said bottom surface corresponding to an associated one of said outward members, each of said ramps having a bottom edge, said bottom edge sloping downwardly between said distal end of said associated outward member and said central member, said bottom edge having a width less than a width of said associated outward member wherein an outwardly facing surface of each said ramp is inset from an outer edge of said associated outward member, each said ramp having a constant width extending from said bottom surface to said bottom edge.

2. The system according to claim 1, wherein said tool comprises a rod having a first end and a second end, said rod being elongated between said first and second ends.

3. The system according to claim 1, wherein:
said tool includes a rod having a first end; and
said first end of said rod being coupled to said top surface corresponding to said central member, said rod being oriented to angle upwardly from said top surface such that said forks form an obtuse angle with said rod.

4. The system according to claim 1, wherein each of said forks is selectively inserted between said selected slat and said frame, each of said forks engaging said slat on opposite sides of said selected nail.

5. The system according to claim 1, wherein, said bottom edge corresponding to each of said ramps engages said frame when said forks are positioned between said selected slat and said frame thereby facilitating said forks to rock upwardly on said frame when said rod is urged downwardly.

6. The system according to claim 5, wherein each of said forks urges said selected slat upwardly from said frame when said rod is urged downwardly thereby removing said selected slat from said frame.

7. A pallet dismantling system comprising:
a pallet having a frame, a plurality of slats and a plurality of nails, each of said nails extending through slats and engaging said frame to fasten said slats on said frame; and
a tool being configured to be manipulated, said tool including a slot, said tool being selectively inserted between a selected one of said slats and said frame having a selected one of said nails being positioned in said slot, said tool being urged to lift said selected slat from said frame such that said tool inhibits said nail from splintering said selected slat when said selected slat is removed from said frame, said tool comprising:
a rod having a first end and a second end, said rod being elongated between said first and second ends,
a pair of forks comprising a central member extending between a pair of outward members, each of said outward members having a distal end with respect to said central member, said outward members being spaced apart from each other to define said slot, said slot extending between said distal end corresponding to each of said outward members and said central member, said pair of forks having a top surface and a bottom surface, said first end of said rod being coupled to said top surface corresponding to said central member, said rod being oriented to angle upwardly from said top surface such that said forks form an obtuse angle with said rod, said forks being selectively inserted between said selected slat and said frame, each of said forks engaging said slat on opposite sides of said selected nail, and a pair of ramps, each of said ramps being coupled to and extending downwardly from said bottom surface corresponding to an associated one of said outward members, each of said ramps having a bottom edge, said bottom edge sloping downwardly between said distal end of said associated outward member and said central member, said bottom edge corresponding to each of said ramps engaging said frame when said forks are positioned between said selected slat and said frame thereby facilitating said forks to rock upwardly on said frame when said rod is urged downwardly, each of said forks urging said selected slat upwardly from said frame when said rod is urged downwardly thereby removing said selected slat from said frame, said bottom edge having a width less than a width of said associated outward member wherein an outwardly facing surface of each said ramp is inset from an outer edge of said associated outward member, each said ramp having a constant width extending from said bottom surface to said bottom edge.

* * * * *